US010581931B2

(12) United States Patent
Ritchie et al.

(10) Patent No.: US 10,581,931 B2
(45) Date of Patent: Mar. 3, 2020

(54) PROCESSING SIGNALLING RELATING TO A TELEPHONY SESSION

(71) Applicant: Metaswitch Networks Ltd., Enfield (GB)

(72) Inventors: Benjamin Ritchie, Enfield (GB); David Court, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/250,967

(22) Filed: Jan. 17, 2019

(65) Prior Publication Data

US 2019/0230217 A1    Jul. 25, 2019

(30) Foreign Application Priority Data

Jan. 22, 2018  (GB) .................................. 1801016.5

(51) Int. Cl.
*H04M 3/42* (2006.01)
*H04L 29/06* (2006.01)

(52) U.S. Cl.
CPC ...... *H04L 65/1069* (2013.01); *H04L 65/1006* (2013.01); *H04L 65/1016* (2013.01); *H04L 65/1046* (2013.01); *H04L 65/1073* (2013.01); *H04L 65/1096* (2013.01);
(Continued)

(58) Field of Classification Search
None
See application file for complete search history.

(56) References Cited

U.S. PATENT DOCUMENTS 7,804,818 B1  9/2010  Atluri et al.
8,830,878 B1  9/2014  van Rensburg
(Continued)

FOREIGN PATENT DOCUMENTS

EP    1705930 A2   9/2006
EP    2475151 A1   7/2012
WO  2009086939 A1  7/2009

OTHER PUBLICATIONS

Combined Search and Exam Report dated Apr. 11, 2018 for Application No. GB1801016.5.
(Continued)

*Primary Examiner* — Quoc D Tran
(74) *Attorney, Agent, or Firm* — EIP US LLP

(57) ABSTRACT

Processing signalling relating to a telephony session in a first telephony network. The session involves a telephony device associated with a second telephony network. A first message received from a first node in the first network comprises a first telephony identifier, associated with the first network, as a called party identifier. A second, different telephony identifier, associated with the first network, is identified. A second message transmitted to the first node comprises the second identifier as a telephony party identifier, whereby to enable call services to be provided in the first network on the basis of the second identifier. A third message, comprising the second identifier as a telephony party identifier, is received from the first node. A third telephony identifier, associated with the second network, is identified using the second identifier. A fourth message, comprising the third identifier as a telephony party identifier, is transmitted to the first node.

20 Claims, 9 Drawing Sheets

(52) U.S. Cl.
CPC ... *H04M 3/42042* (2013.01); *H04M 3/42059* (2013.01); *H04M 3/42238* (2013.01)

(56) References Cited

U.S. PATENT DOCUMENTS

| | | | |
|---|---|---|---|
| 2008/0311888 A1* | 12/2008 | Ku | H04M 7/0024 |
| | | | 455/414.1 |
| 2009/0164556 A1* | 6/2009 | Siegel | H04L 67/16 |
| | | | 709/203 |
| 2009/0168985 A1 | 7/2009 | Yu et al. | |
| 2011/0026468 A1* | 2/2011 | Conrad | H04M 15/00 |
| | | | 370/329 |
| 2012/0177029 A1 | 7/2012 | Hillier et al. | |
| 2012/0250842 A1 | 10/2012 | Low et al. | |
| 2013/0227058 A1* | 8/2013 | Drysdale | H04L 47/70 |
| | | | 709/217 |
| 2013/0295892 A1* | 11/2013 | Backhaus | H04W 4/16 |
| | | | 455/414.1 |
| 2015/0079998 A1* | 3/2015 | Lowman | H04M 3/53316 |
| | | | 455/445 |

OTHER PUBLICATIONS

UK Search Report dated Nov. 12, 2018 for Application No. GB1815300.7.
European Search Report dated May 20, 2019 for European Application No. EP 19152379.4.
United States Pre-Interview First Office Action dated Jun. 27, 2019 for U.S. Appl. No. 16/250,968.

\* cited by examiner

PROCESSING SIGNALLING RELATING TO A TELEPHONY SESSION

CROSS-REFERENCE TO RELATED APPLICATIONS

This application claims the benefit under 35 U.S.C. § 119(a) and 37 CFR § 1.55 to UK patent application no. 1801016.5, filed on Jan. 22, 2018, the entire content of which is incorporated herein by reference.

BACKGROUND OF THE INVENTION

Field of the Invention

The present invention relates to processing signalling relating to a telephony session.

Description of the Related Technology

An individual telephony network serves a subset of the total population of users (also known as "subscribers") of a telephony system. Each such user has a home telephony network, which stores subscriber information for the user and provides call services (also known as "telephony session services") for calls (also known as "telephony sessions") involving the user. The term "home telephony network" as used herein does not imply that the telephony network must be a residential, landline network serving the domestic residence of the user. Examples of call services include, but are not limited to call diverting, call forwarding, call barring etc.

A telephony service provider associated with a telephony network that is not the home network of the user (also known as a "non-home telephony network") may, however, wish to provide such a user with call services.

One, non-limiting, example scenario is where a business operates a bring-your-own-device (BYOD) model. In the BYOD model, the business allows their staff to use their own personal telephony device, for example a smartphone, which is associated with the home telephony network of the staff member, for business purposes. The staff member can have access to services provided by a different telephony network, namely a non-home telephony network, so that such services can be used by the staff member in their business role (also referred to herein as a "business persona"). Such a staff member may be considered to be a "multi-persona user", since they have both a personal persona and business persona. In such an example scenario, both the home telephony network and the non-home telephony network will serve the same telephony device of the staff member, namely the personal telephony device of the staff member.

Another, non-limiting, example scenario is where a non-home telephony network wishes to provide call services to a user who is not willing or able to subscribe to the non-home telephony network, for example instead of subscribing to the home telephony network. For example, the user may be tied into an existing contract with the service provider associated with the home telephony network and/or the service provider associated with the non-home telephony network may not possess a full telephony network.

Non-home telephony networks may, however, not be able to provide call services to such users. For example, IP Multimedia Subsystem (IMS) networks may not be able to provide call services to such users. This is because an IMS network will normally only store subscriber data for, and provide call services to, users who have been allocated a telephony identifier, for example an IP Multimedia Public Identity (IMPU), by that IMS network; in other words where such a telephony identifier can be said to "be owned by" or "belong to" that IMS network.

It would therefore be desirable to enable one telephony network to provide call services to a user associated with another telephony network.

SUMMARY

According to a first aspect of the present invention, there is provided a method of processing signalling relating to a telephony session in a first telephony network, the telephony session involving a telephony device associated with a second telephony network, the method comprising: receiving a first telephony session establishment message from a first telephony network node in the first telephony network, the first telephony session establishment message comprising a first telephony identifier as a called party identifier, the first telephony identifier being associated with the first telephony network; identifying a second telephony identifier, the second telephony identifier being associated with the first telephony network and being different from the first telephony identifier; transmitting a second telephony session establishment message to the first telephony network node, the second telephony session establishment message comprising the second telephony identifier as a telephony party identifier; receiving a third telephony session establishment message from the first telephony network node, the third telephony session establishment message comprising the second telephony identifier as a telephony party identifier; identifying a third telephony identifier using the second telephony identifier, the third telephony identifier being associated with the second telephony network; and transmitting a fourth telephony session establishment message to the first telephony network node, the fourth telephony session establishment message comprising the third telephony identifier as a telephony party identifier.

According to a second aspect of the present invention, there is provided a method of processing signalling relating to a telephony session in a first telephony network, the telephony session involving a telephony device associated with a second telephony network, the method comprising: receiving a first telephony session establishment message, the first telephony session establishment message comprising a first telephony identifier as a called party identifier, the first telephony identifier being associated with the first telephony network; identifying a first telephony network node in the first telephony network based on control logic data associated with the first telephony identifier, the first telephony network node being associated with the first telephony identifier; transmitting a second telephony session establishment message to the first telephony network node, the second telephony session establishment message comprising the first telephony identifier as a called party identifier; receiving a third telephony session establishment message from the first telephony network node, the third telephony session establishment message comprising a second telephony identifier as a telephony party identifier, the second telephony identifier being associated with the first telephony network and being different from the first telephony identifier; identifying the first telephony network node based on control logic data associated with the second telephony identifier, the first telephony network node being associated with the second telephony identifier; transmitting a fourth telephony session establishment message to the first telephony network node, the fourth telephony session establishment message comprising the second telephony identifier as a telephony party identifier; receiving a fifth telephony session establishment message from the first telephony network node, the fifth telephony session establishment message comprising a third telephony identifier as a telephony party identifier, the third telephony identifier being associated with the second telephony network; and transmitting a sixth telephony session establishment message, the sixth telephony session establishment message comprising the third telephony identifier as a telephony party identifier.

According to a third aspect of the present invention, there is provided a telephony network node configured to perform a method in accordance with the first or second aspects of the present invention.

According to a fourth aspect of the present invention, there is provided computer software adapted, when executed, to perform a method in accordance with the first or second aspects of the present invention.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
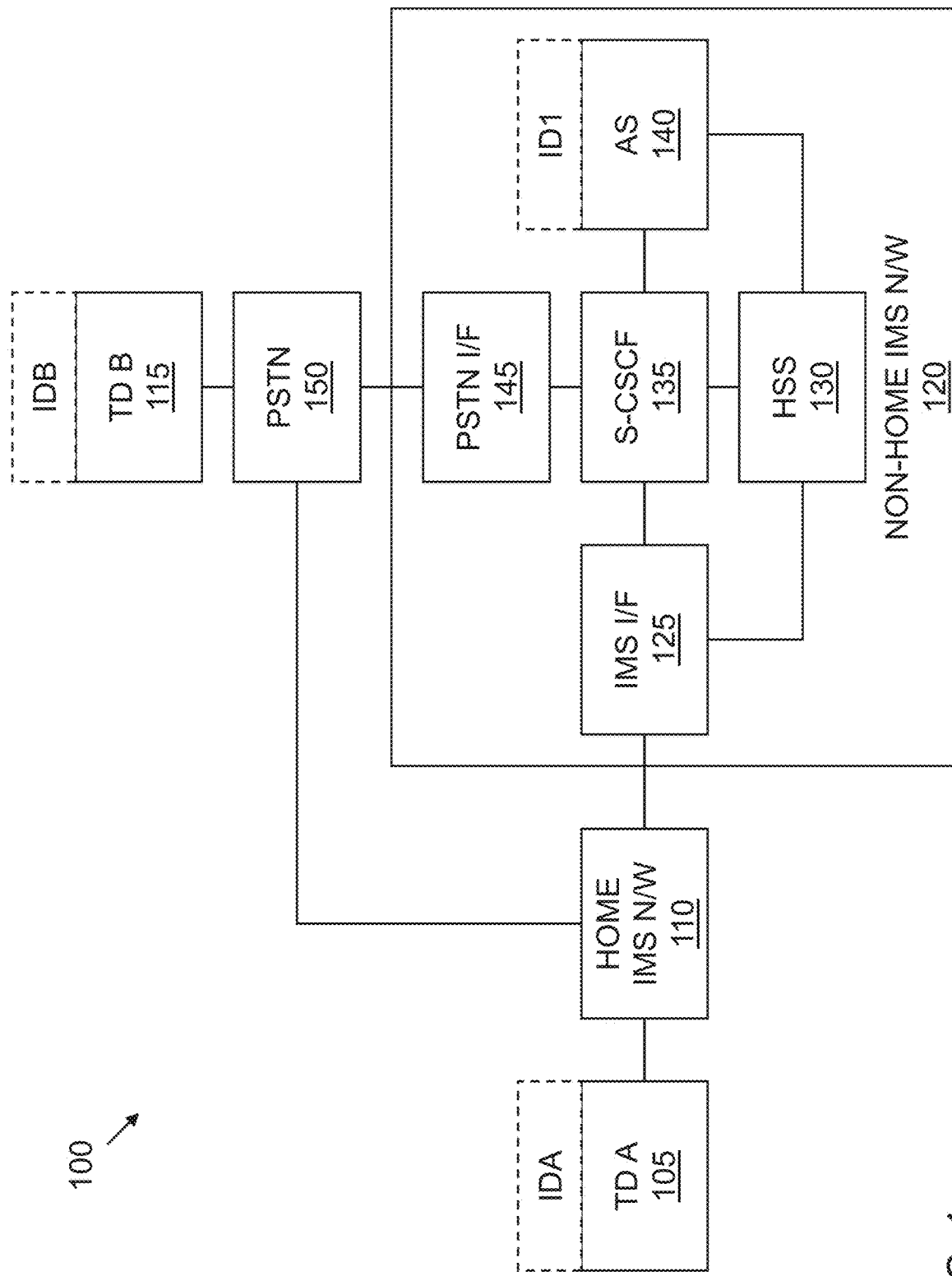
FIG. 1 shows a block diagram of an example of a telephony system.

Referring to FIG. 1, there is shown schematically an example of a telephony system 100. The telephony system 100 is used to process signalling relating to a telephony session.

A telephony session may comprise transmission of one or more of audio data (for example voice data), video data, text data, digital file data etc. A telephony session may, for example, be a voice-only telephone call, a real-time voice and video call, etc.

The telephony system 100 comprises a plurality of interconnected telephony networks, which will be described in more detail below. The telephony networks are typically provided by different telephony service providers. A given telephony service provider may provide one telephony network or may, in some cases, provide more than one telephony network. For example, a given service provider may provide multiple different types of telephony network and/or multiple instances of the same type of telephony network. Such telephony networks may be referred to as "service provider networks" or "service provider telephony networks". Each user of the telephony system 100 has at least one telephony identifier. A telephony identifier identifies the user in at least part of the telephony system 100. Examples of telephony identifiers include, but are not limited to, an E.164 telephone number, an IMPU, a username etc. An IMPU is a Uniform Resource Identifier (URI). An IMPU may be in the form of a Session Initiation Protocol (SIP) URI or a Tel URI. Each telephony identifier is owned by one telephony network, as will also be described in more detail below.

The telephony system 100 comprises a first telephony device 105, denoted "TD A" in FIG. 1.

The first telephony device 105 may be a user telephony device. Examples of user telephony devices include, but are not limited to, smartphones, tablet computing devices, laptop computing devices, desktop computing devices, smart televisions, computer games consoles, wearable computing devices and personal digital assistants. Alternatively, the first telephony device 105 may be a telephony device, but a non-user telephony device. Examples of non-user telephony devices include, but are not limited to, voicemail servers and interactive voice response (IVR) servers.

The first telephony device 105 is associated with a telephony identifier, denoted "ID A" in FIG. 1 and generally referred to herein as ID A.

The telephony system 100 comprises a telephony network 110. The first telephony device 105 is associated with the telephony network 110. The first telephony device 105 may be associated with the telephony network 110 on the basis that the telephony network 110 serves the first telephony device 105. The first telephony device may be associated with the telephony network 110 on the basis that the telephony network 110 is a home network of the first telephony device 105. ID A may be allocated by a service provider associated with the telephony network 110. As such, ID A may be associated with the telephony network 110 on the basis that the service provider associated with the telephony network 110 allocated IDA.

For convenience and brevity, in the specific examples described in more detail below, the telephony network 110 comprises an IMS network, denoted "HOME IMS N/W" in FIG. 1 and generally referred to herein as the "home IMS network 110". It will be understood, however, that the telephony network 110 may be of a different type. For example, the telephony network 110 may comprise a mobile telephony network, a public switched telephone network (PSTN), etc.

The telephony system 100 comprises a second telephony device 115, denoted "TD B" in FIG. 1. The second telephony device 115 is associated with a telephony identifier, denoted "ID B" in FIG. 1 and generally referred to herein as ID B.

The second telephony device 115 may be a user telephony device, non-limiting examples of which are described above. Alternatively, the second telephony device 115 may be a non-user telephony device, non-limiting examples of which are also described above.

For convenience and brevity, in the specific examples described in more detail below, the second telephony device 115 is a plain old telephone service (POTS) telephony device, it being understood that the second telephony device 115 may be of a different type.

The telephony system 100 comprises a telephony network 120. The telephony network 120 also serves the first telephony device 105. In this example, the telephony network 120 is a non-home network of the first telephony device 105.

The service provider with which the telephony networks 110, 120 may be the same or may be different. Where the service providers with which the telephony networks 110, 120 are the same, cooperation in terms of operation of the telephony networks 110, 120 may be possible. Where the service providers with which the telephony networks 110, 120 are different, cooperation in terms of operation of the telephony networks 110, 120 may not be possible.

For convenience and brevity, in the specific examples described in more detail below, the telephony network 120 comprises an IMS network, denoted "NON-HOME IMS N/W" in FIG. 1 and generally referred to herein as the "non-home IMS network 120". It will be understood, however, that the telephony network 120 may be of a different type. For example, the telephony network 120 may be a next-generation network (NGN).

The non-home IMS network 120 comprises a plurality of network nodes, which will be described in more detail below. The term "network node" is used herein to mean one or more hardware component and/or one or more software components of the non-home IMS network 120. A network node may therefore be implemented on one or more hardware resources. A network node may be functionally distributed. For example, a network node may be implemented as one or more virtualized, software components on one or more hardware resources. As such, references herein to "transmitting" and "receiving" data between different network nodes of the non-home IMS network 120 should be understood to include both transmitting and receiving data between different hardware resources and transmitting and receiving data between different software components of a common hardware resource.

The non-home IMS network 120 comprises network node 125. In this specific example, the network node 125 interfaces the home IMS network 110 and is therefore denoted "IMS I/F" in FIG. 1 and is generally referred to herein as the "IMS network interface node 125".

In this example, the IMS network interface node 125 comprises an Interconnection Border Controller Function (IBCF) and an Interrogating-Call Session Control Function (I-CSCF).

The non-home IMS network 120 also comprises network node 130. In this specific example, the network node 130 comprises a Home Subscriber Server (HSS), denoted "HSS" in FIG. 1.

The non-home IMS network 120 also comprises network node 135. In this specific example, the network node 135 comprises a Serving-Call Session Control Function (S-CSCF), denoted "S-CSCF" in FIG. 1.

The non-home IMS network 120 also comprises network node 140. In this specific example, the network node 140 comprises an Application Server (AS), denoted "AS" in FIG. 1. Although only a single AS is depicted in FIG. 1, the network node 140 may comprise one AS, or more than one ASs.

The S-CSCF 135 and the AS 140 communicate with each other via an IMS Service Control (ISC) interface.

The non-home IMS network 120 is associated with a telephony identifier, denoted "ID 1" in FIG. 1 and generally referred to herein as "ID 1". The non-home IMS network 120 may be associated with ID 1 on the basis that the non-home IMS network 120 allocated ID 1. In this example, the AS 140 component of the non-home IMS network 120 is associated with ID 1.

Telephony sessions are established by transmission and reception of signalling. Such signalling comprises telephony session establishment messages. Telephony session establishment messages comprising ID 1 as a called party identifier are routed to the non-home IMS network 120 since ID 1 is associated with the non-home IMS network 120.

The non-home IMS network 120 comprises network node 145. In this specific example, in which the second telephony device 115 is a POTS telephony device, the network node 145 interfaces a PSTN 150 and is therefore denoted "PSTN I/F" in FIG. 1 and is generally referred to herein as the "PSTN interface node 145". The PSTN interface node 145 may, for example, comprise a media gateway control function (MGCF), a breakout gateway control function (BGCF), a signalling gateway (SGW) and a media gateway (MGW).

The non-home IMS network 120 may comprise one or more different network nodes from those shown in FIG. 1 and described above.

If the user of the first telephony device 105 wishes to establish a telephony session with the user of the second telephony device 115 and knows ID B, the user of the first telephony device 105 could cause the first telephony device 105 to transmit a telephony session establishment message comprising ID A and ID B as telephony party identifiers, with ID A as a calling party identifier and ID B as a called party identifier. The term "telephony party identifier" as used herein indicates either a calling party identifier or a called party identifier. Such a telephony session establishment message is referred to herein as an "outgoing" telephony session establishment message with respect to the first telephony device 105. For such outgoing telephony session establishment messages, the first telephony device 105 is referred to as an "originating" telephony device and the second telephony device 115 is referred to as a "terminating" telephony device. Such an outgoing telephony session establishment message would be processed by the home IMS network 110, would be passed to the PSTN 150 via a signalling path (shown in FIG. 1) between the home IMS network 110 and the PSTN 150, and then would then be processed by the PSTN 150 that serves the second telephony device 115. The outgoing telephony session establishment message would not traverse the non-home IMS network 120 because the outgoing telephony session establishment message does not comprise ID 1 as a called party identifier.

Similarly, if the user of the second telephony device 115 wishes to establish a telephony session with the user of the first telephony device 105 and knows ID A, the user of the second telephony device 115 could cause the second telephony device 115 to transmit a telephony session establishment message comprising ID B and ID A as telephony party identifiers, with ID B as a calling party identifier and ID A as a called party identifier. Such a telephony session establishment message is referred to herein as an "incoming" telephony session establishment message with respect to the first telephony device 105. For such incoming telephony session establishment messages, the second telephony device 115 is referred to as an "originating" telephony device and the first telephony device 105 is referred to as a "terminating" telephony device. Such an incoming telephony session establishment message would be processed by the PSTN 150 that serves the second telephony device 115, would be passed to the home IMS network 110 via a signalling path (shown in FIG. 1) between the PSTN 150 and the home IMS network 110, and would then be processed by the home IMS network 110. The incoming telephony session establishment message would not traverse the non-home IMS network 120 because the incoming telephony session establishment message does not comprise ID 1 as a called party identifier.

Such telephony session establishment procedures rely on the user of the originating telephony device, and/or the originating telephony device itself, being able to identify the telephony identifier associated with the terminating telephony device. This limits the scenarios in which such telephony session establishment procedures can be used. For example, ID A may be a personal telephony identifier of the user of the first telephony device 105 and the user of the first telephony device 105 may not wish the user associated with the second telephony device 115 to know their personal telephony identifier.

Furthermore, since such telephony session establishment messages do not traverse the non-home IMS network 120, the non-home IMS network 120 cannot provide any telephony session services in relation to the telephony session.

As will be described in more detail below, to enable the telephony session establishment message to be routed via the non-home IMS network 120, the originating telephony device may transmit a telephony session establishment message comprising ID 1 as a called party identifier.

For an outgoing telephony session establishment message with respect to the first telephony device 105, ID 1 may serve as an access telephony identifier. The access telephony identifier enables the non-home IMS network 120 to be accessed in relation to the establishment of the telephony session between the first and second telephony devices 105, 115. ID 1 may be a designated telephony identifier allocated by the non-home IMS network 120 for handling such telephony session establishment messages. The first telephony device 105 may be configured to use ID 1 as a called party identifier for outgoing telephony session establishment messages that are to traverse the non-home IMS network 120. Software on the first telephony device 105 may be configured to use ID 1 as a called party identifier for such telephony session establishment messages. For example, the first telephony device 105 may be configured to use ID 1 as a called party identifier for an outgoing telephony session to the second telephony device 115 where the telephony session relates to a business persona of the user of the first telephony device 105 and may be configured to use ID B as a called party identifier for an outgoing telephony session to the second telephony device 115 where the telephony session relates to the personal persona of the user of the first telephony device 105. Where the first telephony device 105 uses ID 1 as a called party identifier for an outgoing telephony session, such that the telephony session establishment messages traverse the non-home IMS network 120, the first telephony device 105 may provide ID B to the non-home IMS network 120 so that the non-home IMS network 120 can identify the intended ultimate destination for the telephony session. The first telephony device 105 may provide ID B to the non-home IMS network 120 out-of-band with respect to the telephony session establishment message that comprises ID 1 as a called party identifier, or in another manner. The reader is referred to UK patent application no. 1713859.5, which describes multi-persona users. The entire content of UK patent application no. 1713859.5 is incorporated herein by reference.

For an incoming telephony session establishment message with respect to the first telephony device 105, ID 1 may serve as a shared telephony identifier. For example, ID 1 may be a shared telephony identifier associated with telephony identifiers of multiple members of staff of a business. The shared telephony identifier may correspond to a support line, switchboard line, etc. An incoming telephony session establishment message with the shared telephony identifier as a called party identifier may therefore be routed to the non-home IMS network 120. The non-home IMS network 120 can identify the telephony identifiers of the multiple members of staff of the business associated with ID 1 and can transmit respective telephony session establishment messages with the telephony identifiers of the multiple members of staff of the business as called party identifiers.

As such, ID 1 enables telephony session establishment messages to get into the non-home IMS network 120 for processing by the non-home IMS network 120. For an outgoing telephony session establishment message from the first telephony device 105, the first telephony device 105 directs the outgoing telephony session establishment message to ID 1, which serves as an access telephony identifier for the non-home IMS network 120. For an incoming telephony session establishment message, transmitted from the second telephony device 115, the incoming telephony session establishment message arrives at the non-home IMS network 120 by use of ID 1 as a called party identifier.

Figure 2:
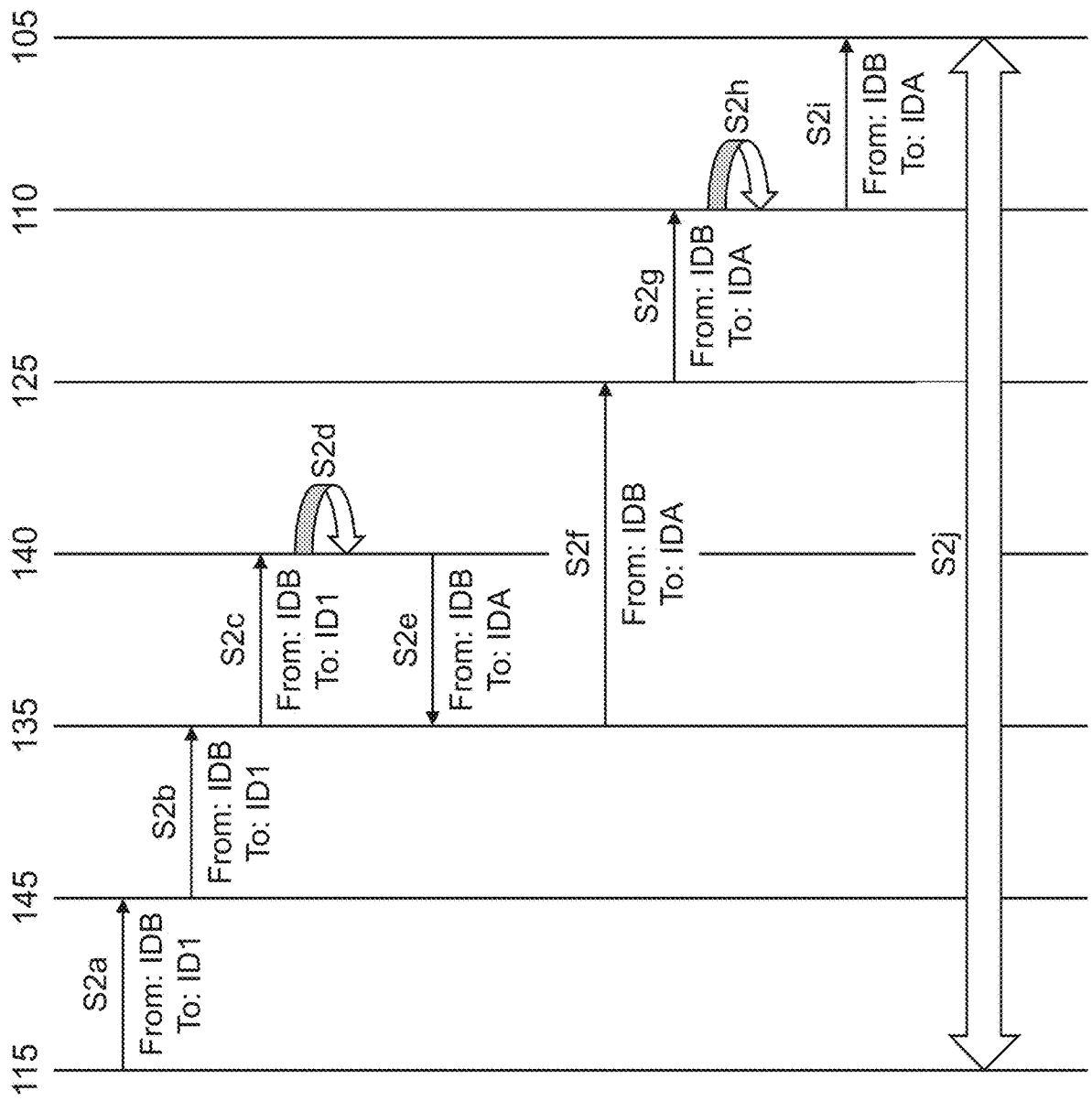
FIG. 2 shows a sequence diagram depicting an example of a method of processing signalling relating to a telephony session.

Referring to FIG. 2, there is depicted an example of a method of processing signalling relating to a telephony session. The method may be performed in the telephony system 100 described above with reference to FIG. 1, or otherwise. In this example, the telephony session is an incoming telephony session with respect to the first telephony device 105.

At item S2*a*, the second telephony device 115 transmits a telephony session establishment message via the PSTN 150 to the PSTN interface node 145. The telephony session establishment message of item S2*a* comprises telephony party identifiers ID B and ID 1, with ID B being a calling party identifier and ID 1 being a called party identifier. ID B may be a shared telephony identifier, as described above, or otherwise.

At item S2*b*, the PSTN interface node 145 transmits a telephony session establishment message, based on the telephony session establishment message of item S2*a*, to the S-CSCF 135. The telephony session establishment message of item S2*b* comprises telephony party identifiers ID B and ID 1, with ID B being a calling party identifier and ID 1 being a called party identifier.

The S-CSCF 135 is configured with control logic data indicating that the AS 140 is to be invoked for telephony sessions in relation to which ID 1 is a called party identifier. Control logic data may also be referred to as "filter" data. In this example, the control logic data comprises Initial Filter Criteria (iFC) data. The iFC data associated with ID 1 may be stored in the HSS 130 initially. When ID 1 is registered with the S-CSCF 135, the S-CSCF 135 may obtain the iFC data associated with ID 1 from the HSS 130 and store the iFC data associated with ID 1 locally.

At item S2*c*, the S-CSCF 135 invokes the AS 140 based on the iFC data with which it is configured. Invoking the AS 140 comprises the S-CSCF 135 transmitting a telephony session establishment message, based on the telephony session establishment message of item S2*b*, to the AS 140 via the ISC interface. The telephony session establishment message of item S2*c* comprises telephony party identifiers ID B and ID 1, with ID B being a calling party identifier and ID 1 being a called party identifier.

At item S2*d*, the AS 140 identifies ID A. The AS 140 may identify ID A using ID 1, which is comprised in the telephony session establishment message of item S2*c* as a called party identifier. For example, the AS 140 may look up ID A using ID 1.

At item S2e, the AS 140 transmits a telephony session establishment message, based on the telephony session establishment message of item S2c, to the S-CSCF 135 via the ISC interface. The telephony session establishment message of item S2e comprises telephony party identifiers ID B and ID A, with ID B being a calling party identifier and ID A being a called party identifier. As such, whereas the called party identifier comprised in the telephony session establishment messages of items S2a, S2b and S2c is ID 1, the called party identifier comprised in the telephony session establishment message of item S2e is ID A.

At item S2f, the S-CSCF 135 transmits a telephony session establishment message, based on the telephony session establishment message of item S2e, to the IMS network interface node 125. The telephony session establishment message of item S2f comprises telephony party identifiers ID B and ID A, with ID B being a calling party identifier and ID A being a called party identifier.

At item S2g, the IMS network interface node 125 transmits a telephony session establishment message, based on the telephony session establishment message of item S2f, to the home IMS network 110. The telephony session establishment message of item S2g comprises telephony party identifiers ID B and ID A, with ID B being a calling party identifier and ID A being a called party identifier. At item S2h, the home IMS network 110 may provide one or more terminating call services in relation to the telephony session, based on the telephony session establishment message of item S2g.

At item S2i, the home IMS network 110 transmits a telephony session establishment message, based on the telephony session establishment message of item S2g, to the first telephony device 105. The telephony session establishment message of item S2i comprises telephony party identifiers ID B and ID A, with ID B being a calling party identifier and ID A being a called party identifier.

At item S2j, a telephony session is established between the first and second telephony devices 105, 115.

Figure 3A:
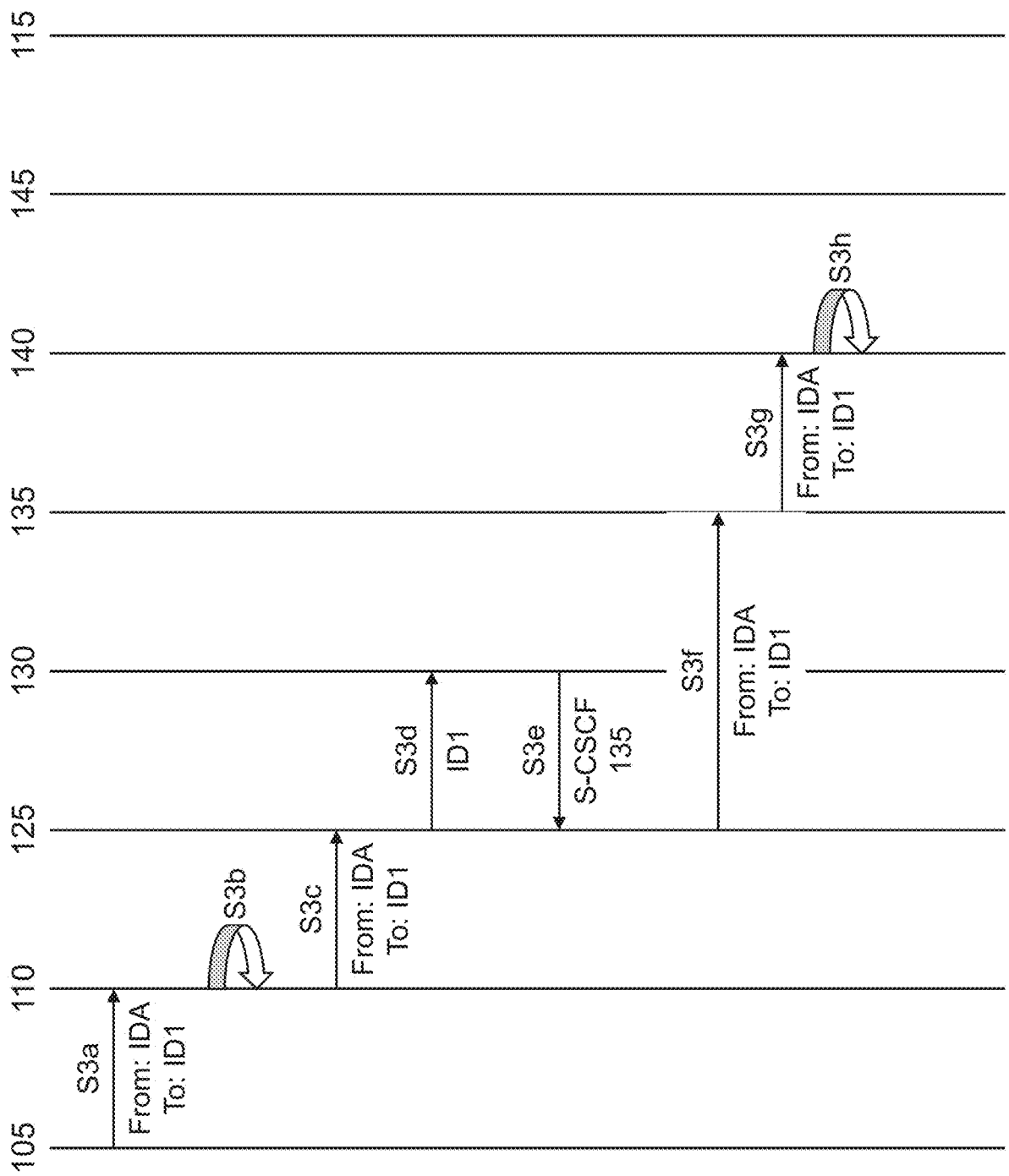
FIGS. 3A and 3B show a sequence diagram depicting another example of a method of processing signalling relating to a telephony session.
Figure 3B:
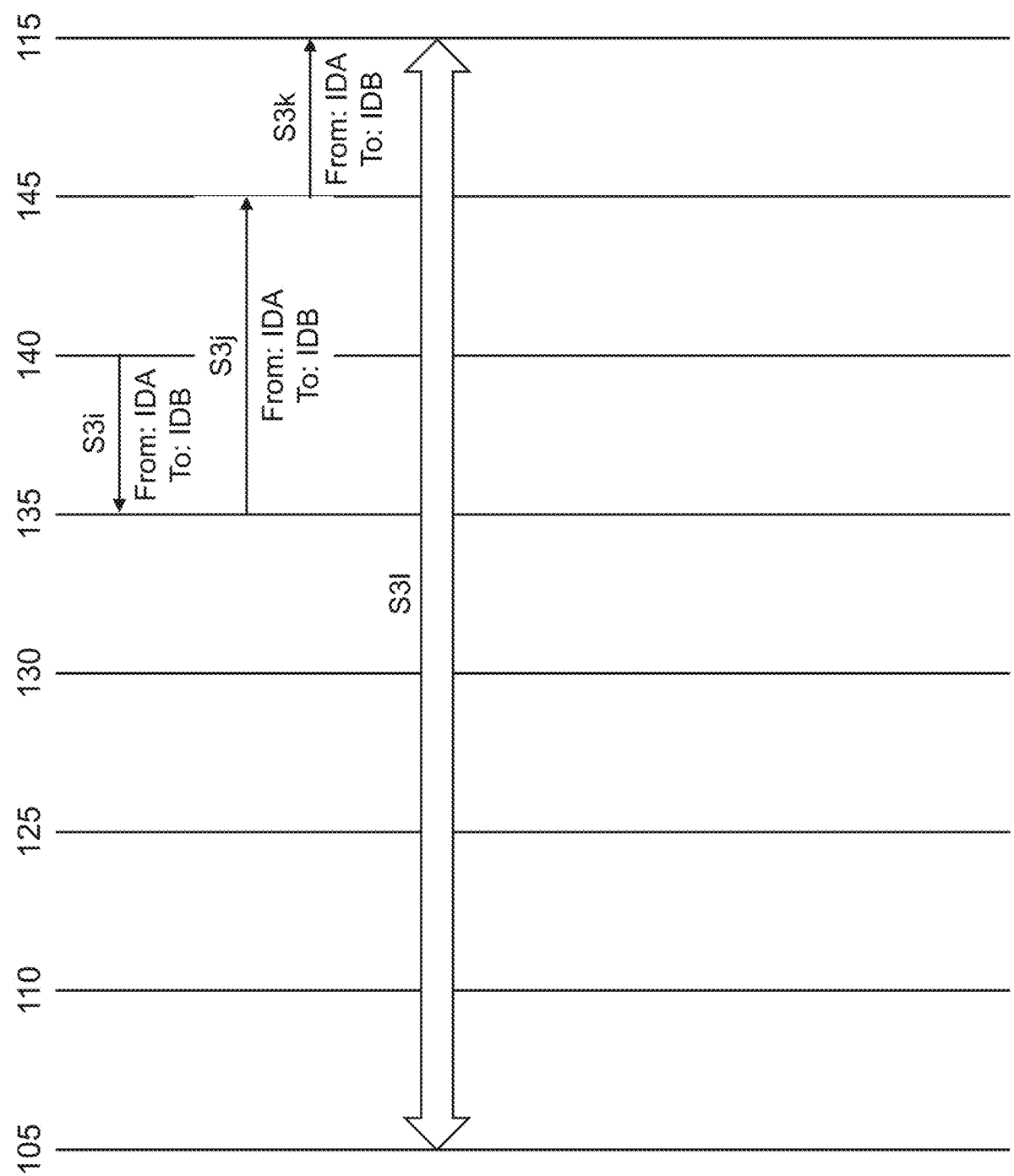

Referring to FIGS. 3A and 3B, there is depicted an example of a method of processing signalling relating to a telephony session. The method may be performed in the telephony system 100 described above with reference to FIG. 1, or otherwise. In this example, the telephony session is an outgoing telephony session with respect to the first telephony device 105.

At item S3a, the first telephony device 105 transmits a telephony session establishment message to the home IMS network 110. The telephony session establishment message of item S3a comprises telephony party identifiers ID A and ID 1, with ID A being a calling party identifier and ID 1 being a called party identifier. The telephony session establishment message of item S3a traverses the home IMS network 110 because, in this example, the home IMS network 110 is the home telephony network associated with the first telephony device 105.

At item S3b, the home IMS network 110 may provide one or more originating call services in relation to the telephony session, based on the telephony session establishment message of item S3a.

At item S3c, the home IMS network 100 transmits a telephony session establishment message, based on the telephony session establishment message of item S3a, to the IMS network interface node 125. The telephony session establishment message of item S3c comprises telephony party identifiers ID A and ID 1, with ID A being a calling party identifier and ID 1 being a called party identifier. The telephony session establishment message of item S3c is routed to the non-home IMS network 120 because the called party identifier is ID 1, is associated with the non-home IMS network 120.

At item S3d, the IMS network interface node 125 transmits a query message, based on the telephony session establishment message of item S3c, to the HSS 130. The query message of item S3d requests the HSS 130 to indicate which S-CSCF in the non-home IMS network 120 is assigned to ID 1. The query message of item S3d comprises telephony party identifier ID 1.

At item S3e, the HSS 130 transmits a response message, based on the query message of item S3d, to the IMS network interface node 125. The response message of item S3e indicates that the S-CSCF 135 is assigned to ID 1.

At item S3f, the IMS network interface node 125 transmits a telephony session establishment message, based on the telephony session establishment message of item S3c and the response message of item S3e, to the S-CSCF 135. The telephony session establishment message of item S3f comprises telephony party identifiers ID A and ID 1, with ID A being a calling party identifier and ID 1 being a called party identifier.

At item S3g, the S-CSCF 135 invokes the AS 140. The S-CSCF 135 may invoke the AS 140 based on iFC data associated with ID 1 indicating that the AS 140 is to be invoked for telephony session establishment messages comprising ID 1 as a called party identifier. Invoking the AS 140 comprises the S-CSCF 135 transmitting a telephony session establishment message, based on the telephony session establishment message of item S3f, to the AS 140 via the ISC interface. The telephony session establishment message of item S3g comprises telephony party identifiers ID A and ID 1, with ID A being a calling party identifier and ID 1 being a called party identifier.

At item S3h, the AS 140 identifies ID B. As explained above, the AS 140 may be able to identify ID B by receiving ID B out-of-band from the first telephony device 105, or otherwise.

At item S3i, the AS 140 transmits a telephony session establishment message, based on the telephony session establishment message of item S3g, to the S-CSCF 135 via the ISC interface. The telephony session establishment message of item S3i comprises telephony party identifiers ID A and ID B, with ID A being a calling party identifier and ID B being a called party identifier. As such, whereas the called party identifier comprised in the telephony session establishment messages of items S3a, S3c, S3d, S3e, S3f and S3g is ID 1, the called party identifier comprised in the telephony session establishment message of item S3i is ID B.

At item S3j, the S-CSCF 135 transmits a telephony session establishment message, based on the telephony session establishment message of item S3i, to the PSTN interface node 145. The telephony session establishment message of item S3j comprises telephony party identifiers ID A and ID B, with ID A being a calling party identifier and ID B being a called party identifier.

At item S3k, the PSTN interface node 145 transmits a telephony session establishment message, based on the telephony session establishment message of item S3j, to the second telephony device 115 via the PSTN 150. The telephony session establishment message of item S3k comprises telephony party identifiers ID A and ID B, with ID A being a calling party identifier and ID B being a called party identifier.

At item S3l, a telephony session is established between the first and second telephony devices 105, 115.

In the examples described above with reference to FIGS. 1, 2, 3A and 3B, although the home IMS network 110 may provide terminating and/or originating call services in relation to the telephony sessions, and although the telephony session establishment messages have traversed the non-home IMS network 120, the non-home IMS network 120 has not provided any terminating or originating call services in relation to the telephony session.

Embodiments of the present invention will now be described that enable the non-home IMS network 120 to provide terminating and/or originating call services in relation to such telephony sessions.

Figure 4:
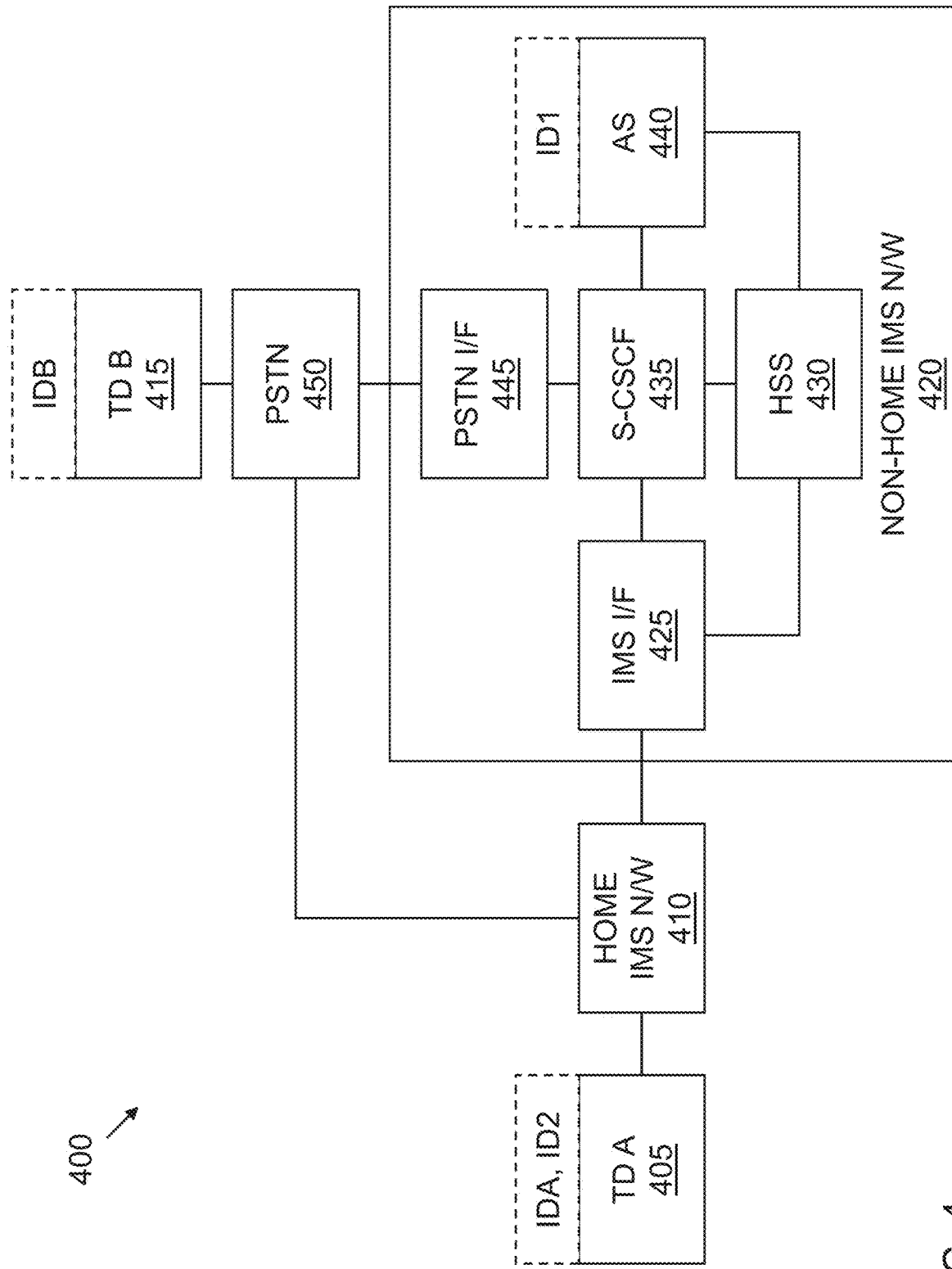
FIG. 4 shows a block diagram of an example of a telephony system in accordance with embodiments of the present invention.

Referring to FIG. 4, there is shown schematically an example of a telephony system 400 in accordance with embodiments of the present invention. The telephony system 400 corresponds closely to the telephony system 100 described above with reference to FIG. 1. Features shown in FIG. 4 that are the same as, or are similar to, corresponding features shown in FIG. 1 are indicated in FIG. 4 using the same reference numerals as in FIG. 1, but incremented by 300.

In the telephony system 400, the first telephony device 405 is associated with a further telephony identifier, denoted "ID 2" in FIG. 1 and generally referred to herein as ID 2. ID 2 is different from ID 1.

The association of the first telephony device 405 with ID 2 enables the non-home IMS network 420 to provide originating and/or terminating call services to telephony sessions involving the first telephony device 405. Further, such originating and/or terminating call services may be provided on a per-user basis, may provide limited risk of creating routing problems within the wider telephony system 400 and may not involve modifying the S-CSCF 435.

A service provider associated with the non-home IMS network 420 may allocate ID 2. ID 2 may therefore be owned by the non-home IMS network 420. The service provider associated with the non-home IMS network 420 may allocate ID 2 on the basis that ID A is not owned by the non-home IMS network 420. ID 2 may be associated with the non-home IMS network 420 on the basis that a service provider associated with the non-home IMS network 420 allocated ID 2.

In some examples, ID 2 is used only within the non-home IMS network 420. In other words, in such examples, ID 2 is not communicated outside the non-home IMS network 420. In such examples, ID 2 may be considered to be a local telephony identifier configured to be recognized in the non-home IMS network 420 and configured not to be recognized in the home IMS network 410. A local telephony identifier may also be referred to as a "private" telephony identifier in the sense that the local telephony identifier is only used within the non-home IMS network 420.

In contrast, although ID A is associated with the home IMS network 410, ID A is communicated outside the home IMS network 410. For example, ID A is communicated to the non-home IMS network 420. In addition, although ID 1 is associated with the non-home IMS network 420, ID 1 is communicated outside the non-home IMS network 420. For example, ID 1 is communicated to the home IMS network 410. ID A and ID 1 may be considered to be public telephony identifiers configured to be recognized in the home and non-home IMS networks 410, 420. A public telephony identifier may also be referred to as a "global" telephony identifier in the sense that the global telephony identifier is used in multiple telephony networks.

A service provider associated with the non-home IMS network 420 may therefore allocate ID 2 to a user not owned by the non-home IMS network 420 and allocate data storage space for ID 2 in the non-home IMS network 420. ID 2 can have subscriber data stored against it in the non-home IMS network 420. ID 2 is selected to be different from ID A such that ID is not the same as the public telephony identifier ID A used in the wider telephony system 400.

ID 2 may comprise ID A. ID 2 may be an IMPU in the form of a SIP URI of sip:IDA@domain, where "domain" corresponds to the domain of the non-home IMS network 420. In such cases, ID 2 can be derived algorithmically from ID A by adding "sip:" in front of, and "@domain" after, ID A. ID A can be derived algorithmically from ID 2 by removing the "sip:" and "@domain" components of ID 2 to leave ID A.

Figure 5A:
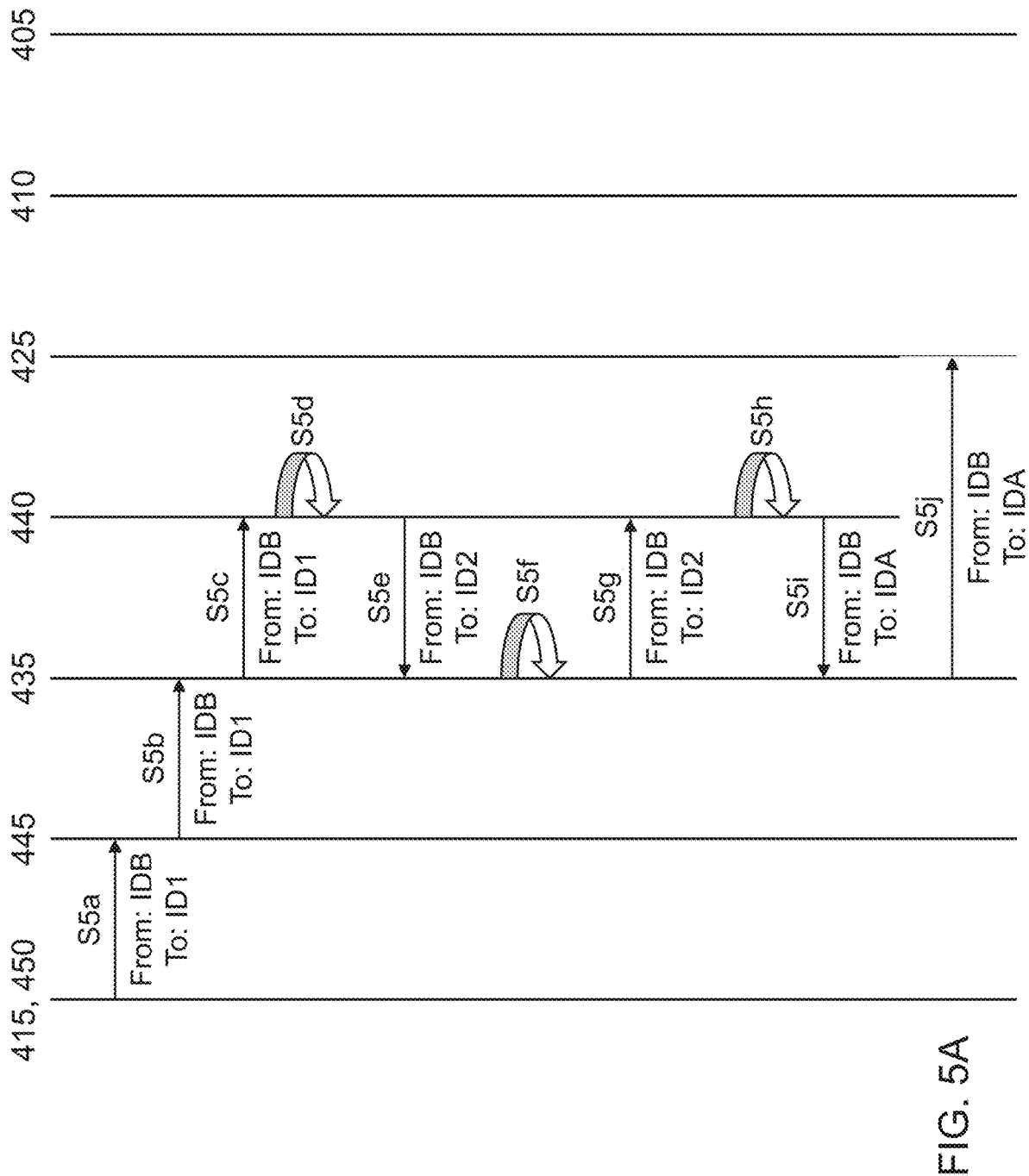
FIGS. 5A and 5B show a sequence diagram depicting an example of a method of processing signalling relating to a telephony session in accordance with embodiments of the present invention.
Figure 5B:
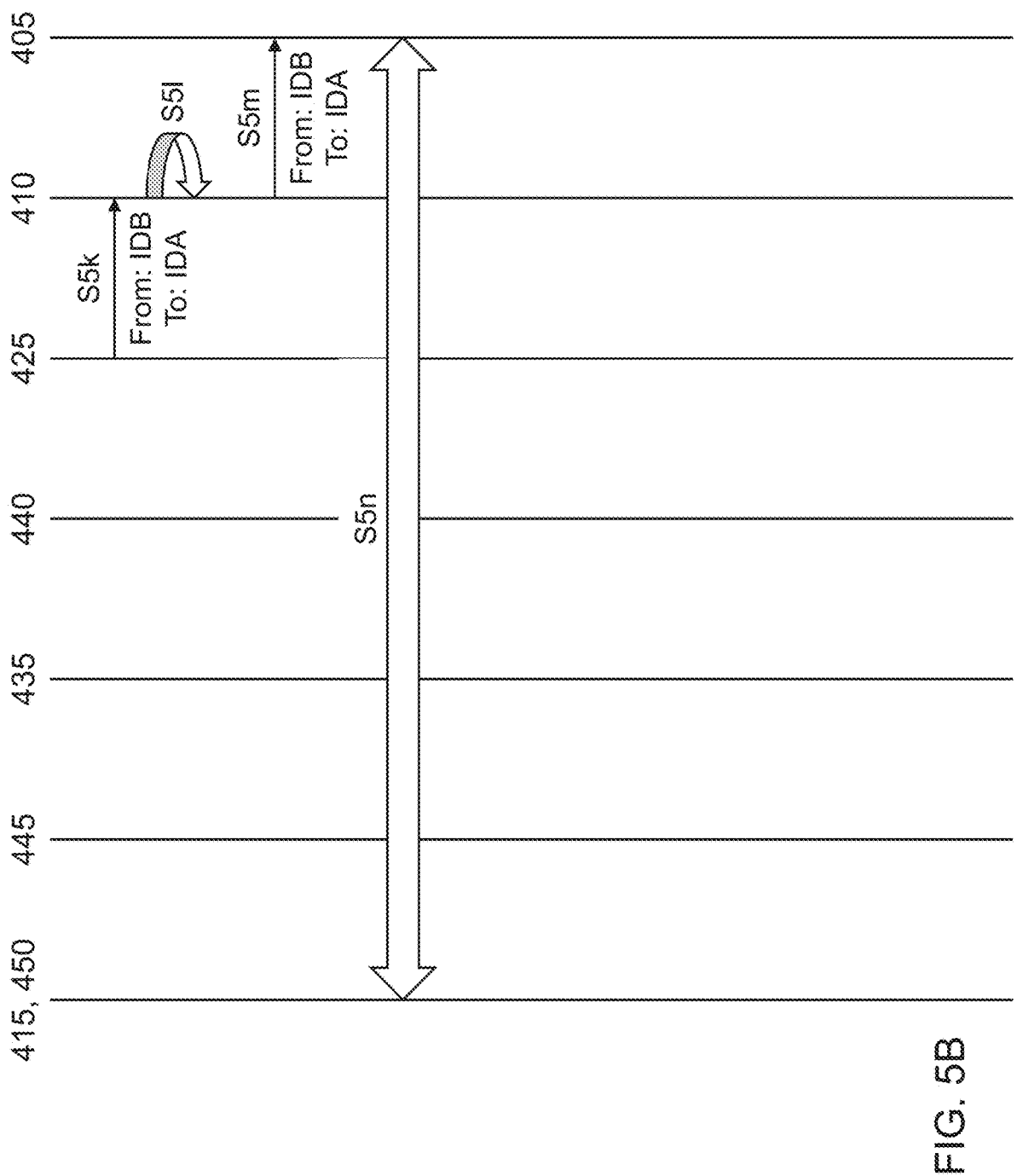

Referring to FIGS. 5A and 5B, there is depicted an example of a method of processing signalling relating to a telephony session in accordance with embodiments of the present invention. The method may be performed in the telephony system 400 described above with reference to FIG. 4, or otherwise. In this example, the telephony session is an incoming telephony session with respect to the first telephony device 405.

Items S5a to S5c correspond, respectively, to items S2a to S2c described above with reference to FIG. 2.

However, item S5d differs from item S2d. Whereas, at item S2d, the AS 140 identifies ID A, at item S5d, the AS 440 identifies ID 2.

At item S5e, the AS 440 transmits a telephony session establishment message, based on the telephony session establishment message of item S5c, to the S-CSCF 435 via the ISC interface. The telephony session establishment message of item S5e comprises telephony party identifiers ID B and ID 2, with ID B being a calling party identifier and ID 2 being a called party identifier. As such, whereas the called party identifier comprised in the telephony session establishment message of item S2e is ID A, the called party identifier comprised in the telephony session establishment message of item S5e is ID 2.

At item S5f, the S-CSCF 435 performs one or more actions based on the telephony session establishment message of item S5e.

In this example, the S-CSCF 435 is configured with iFC data associated with ID 2. The iFC data indicates that the AS 440 is to be invoked again, based on ID 2.

In some examples, the iFC data indicates that one or more further ASs are to be invoked, based on ID 2. The one or more further ASs may provide terminating call services in relation to the telephony session. Where such one or more further ASs are to be invoked, the iFC data is arranged to indicate that the AS 440 is to be invoked after the one or more further ASs have been invoked. The iFC data may indicate a priority (also referred to as an "order") for each AS to be invoked, with the highest priority AS being invoked first and the lowest priority AS being invoked last. As such, the iFC data could indicate, in the form of an ordered list, that the AS 440 has the lowest priority where one or more further AS are to be invoked, the one or more further AS having one or more higher priorities than the priority associated with the AS 440.

In other examples, the iFC data does not indicate that one or more further ASs are to be invoked, based on ID 2. In some such examples, the AS 440 may provide terminating call services in relation to the telephony session. In other such examples, the non-home IMS network 420 may not provide terminating call services in relation to the telephony session.

At item S5g, the S-CSCF 435 invokes the AS 440. As described above, one or more further ASs may have been invoked at item S5f. Invoking the AS 440 at item S5g comprises the S-CSCF 435 transmitting a telephony session establishment message, based on the telephony session establishment message of item S5e, to the AS 440 via the ISC interface. The telephony session establishment message of item S5g comprises telephony party identifiers ID B and ID 2, with ID B being a calling party identifier and ID 2 being a called party identifier. As such, whereas the called party identifier comprised in the telephony session establishment message of item S5c is ID 1, the called party identifier comprised in the telephony session establishment message of item S5g is ID 2.

At item S5h, the AS 440 identifies ID A. The AS 440 may identify ID A using ID 2, which is comprised in the telephony session establishment message of S5g as a called party identifier, or otherwise.

Items S5i to S5n correspond, respectively, to items S2e to S2j described above with reference to FIG. 2.

As such, for one or more telephony sessions being made to the user associated with the first telephony device 405, via a shared line (associated with ID 1), a telephony session establishment message arrives at the shared line, which is owned by the non-home IMS network 420, and in particular by the AS 440. The AS 440 then identifies one or more telephony identifiers to which the telephony session establishment message is to be forwarded. The AS 440 does not use ID A here, because ID A is owned by the home IMS network 410 and transmitting a telephony session establishment message with ID A as a called party identifier would result in the telephony session establishment message being transmitted to the home IMS network 410. Instead, the telephony session establishment message comprises ID 2 as a called party identifier. The telephony session establishment message is transmitted to the S-CSCF 435 in the IMS core of the second telephony network 420. The S-CSCF 435, and other network node in the IMS core of the non-home IMS network 420 process the telephony session establishment message and related telephony session establishment messages in accordance with standard IMS core behaviour, providing the desired telephony session services for the user associated with the first telephony device 405. Such telephony session services are applied automatically using the local telephony identity, ID 2, as the source for subscriber configuration, as the telephony session establishment message appears, to the S-CSCF 435, to be directed to ID 2. Applying the telephony session services may involve the S-CSCF 435 invoking one or more further ASs, which may include the AS 440, to perform such telephony session services. Via configuration of the iFC data with which the S-CSCF 435 is configured, the last AS that the S-CSCF 435 invokes is a second invocation of the AS 440. On this second invocation, the AS 440 replaces the local telephony identifier, ID 2, with the public identity, ID A. The AS 440 then passes the telephony session back to the S-CSCF 435 by transmitting a telephony session establishment message, comprising ID A as a called party identifier, to the S-CSCF 435. Since the S-CSCF 435 does not own ID A, the S-CSCF 435 forwards the telephony session establishment message to the owning telephony network, namely the home IMS network 410. Although, as explained above, in some examples, the S-CSCF 435 invokes one or more further ASs to perform telephony session services with AS 440 being invoked for the second time after the telephony session services have been performed, the S-CSCF 435 could invoke the AS 440 to perform the telephony session services, with the AS 440 replacing the local telephony identifier, ID 2, with the public identity, ID A, without any further ASs being invoked.

Figure 6A:
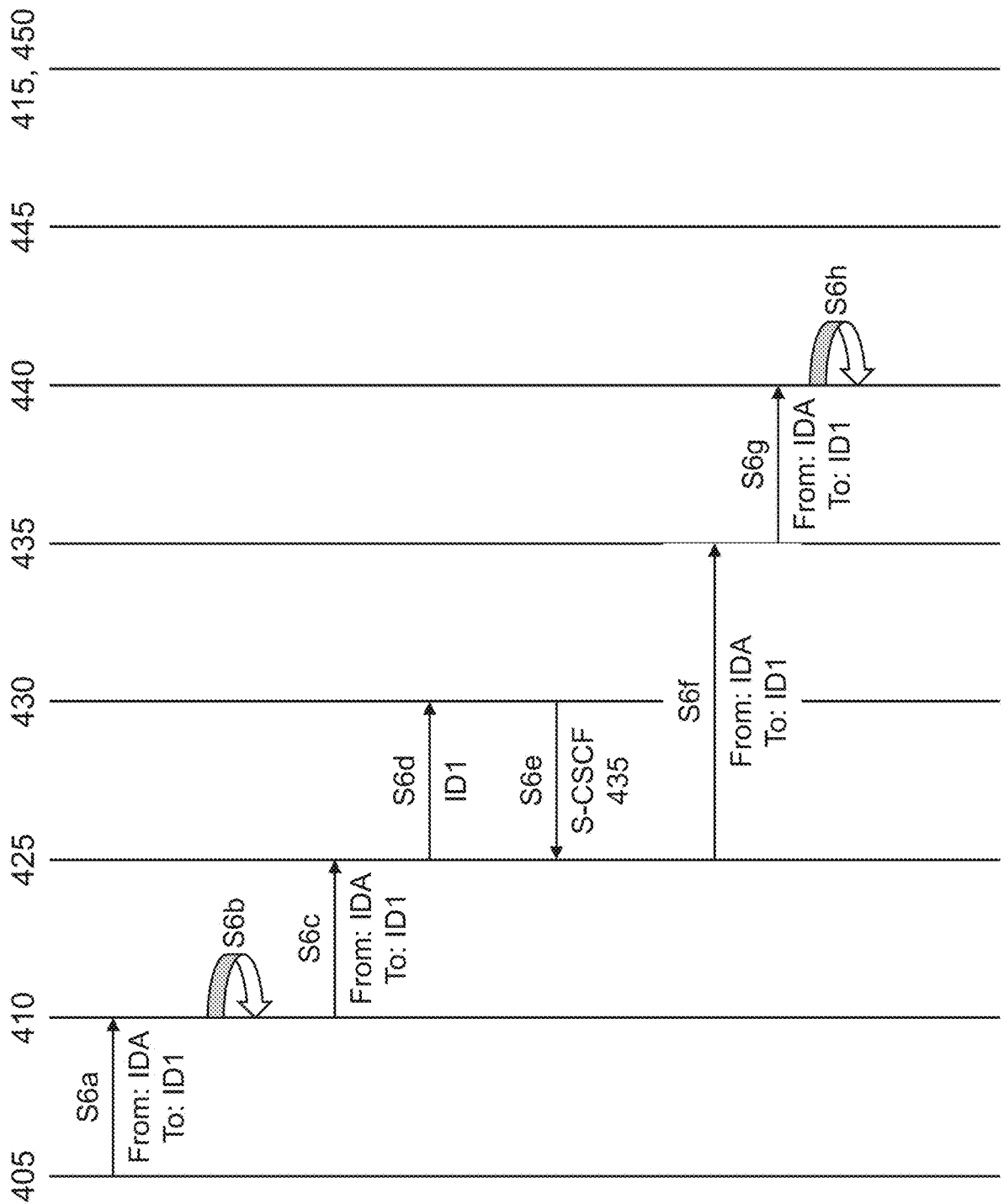
FIGS. 6A and 6B show a sequence diagram depicting another example of a method of processing signalling relating to a telephony session in accordance with embodiments of the present invention.
Figure 6B:
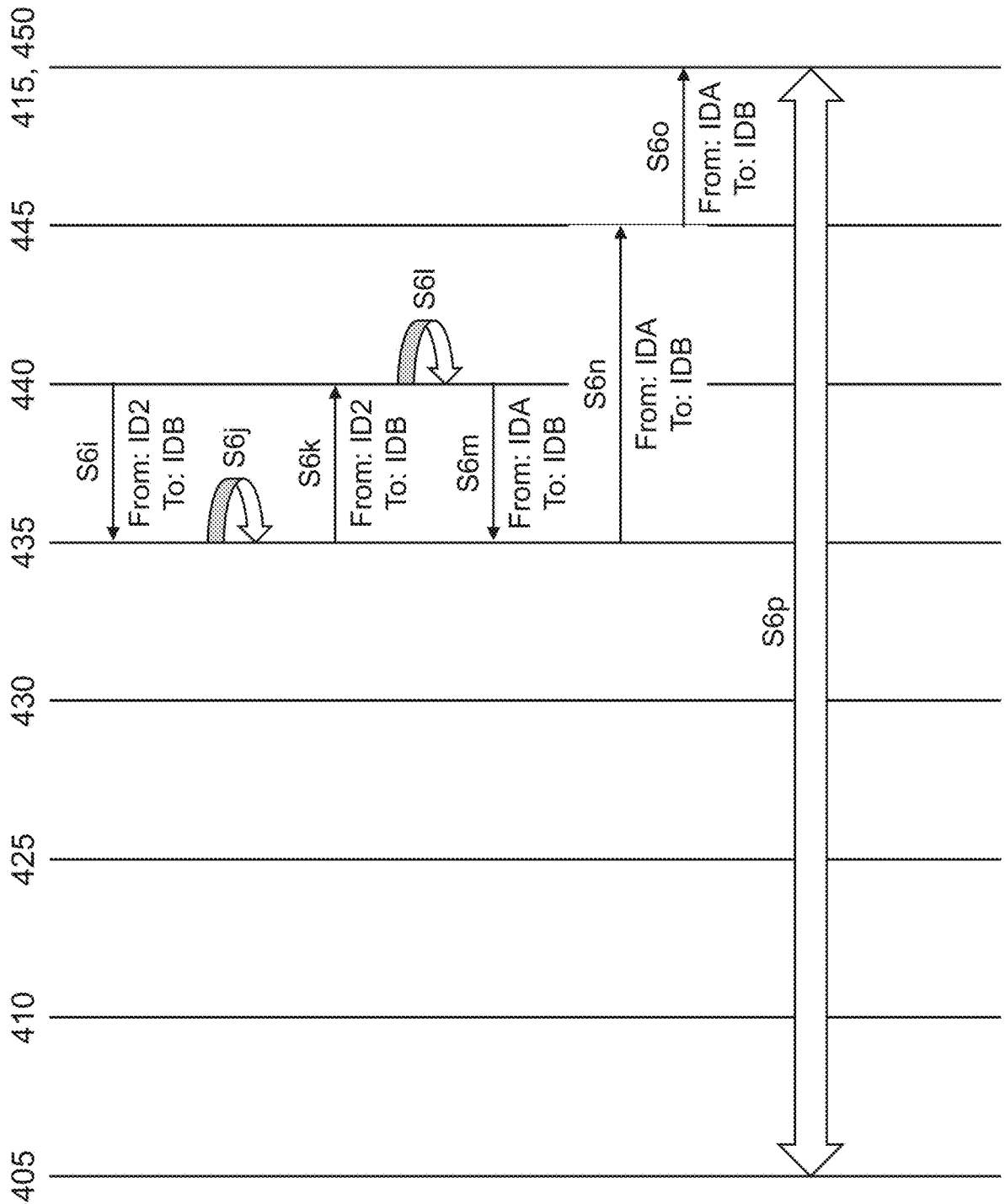

Referring to FIGS. 6A and 6B, there is depicted an example of a method of processing signalling relating to a telephony session in accordance with embodiments of the present invention. The method may be performed in the telephony system 400 described above with reference to FIG. 4, or otherwise. In this example, the telephony session is an outgoing telephony session with respect to the first telephony device 405.

Items S6a to S6g correspond, respectively, to items S3a to S3g described above with reference to FIGS. 3A and 3B.

At item S6h, the AS 440 identifies ID 2. The AS 440 may be able to identify ID 2 using ID 1, which is comprised in the telephony session establishment message of item S6g. Alternatively, or additionally, the AS 440 may be able to identify ID 2 using ID A, which is also comprised in the telephony session establishment message of item S6g.

At item S6h, the AS 440 also identifies ID B. The AS 440 may be able to identify ID B using ID 1, which is comprised in the telephony session establishment message of item S6g. Alternatively, or additionally, the AS 440 may be able to identify ID B in a different manner. For example, the AS 440 may be able to receive ID B from the first telephony device 405.

At item S6i, the AS 440 transmits a telephony session establishment message, based on the telephony session establishment message of item S6g, to the S-CSCF 435 via the ISC interface. The telephony session establishment message of item S6i comprises telephony party identifiers ID 2 and ID B, with ID 2 being a calling party identifier and ID B being a called party identifier.

At item S6j, the S-CSCF 435 performs one or more actions based on the telephony session establishment message of item S6i.

In this example, the S-CSCF 435 is configured with iFC data associated with ID 2. The iFC data indicates that the AS 440 is to be invoked again, based on ID 2.

In some examples, the iFC data indicates that one or more further ASs are to be invoked, based on ID 2. The one or more further ASs may provide originating call services in relation to the telephony session. Where such one or more further ASs are to be invoked, the iFC data indicates that the AS 440 is to be invoked after the one or more further ASs have been invoked.

In other examples, the iFC data does not indicate that one or more further ASs are to be invoked, based on ID 2. In some such examples, the AS 440 may provide originating call services in relation to the telephony session. In other such examples, the non-home IMS network 420 may not provide originating call services in relation to the telephony session.

At item S6k, the S-CSCF 435 invokes the AS 440. Invoking the AS 440 comprises the S-CSCF 435 transmitting a telephony session establishment message, based on the telephony session establishment message of with item S6i, to the AS 440 via the ISC interface. The telephony session establishment message of item S6k comprises telephony party identifiers ID 2 and ID B, with ID 2 being a calling party identifier and ID B being a called party identifier.

At item S6l, the AS 440 identifies ID A. The AS 440 may identify ID A using ID 2, which is comprised in the telephony session establishment message of item S6k as a called party identifier. Although, in this example, the AS 440 identifies ID B at item S6*h*, the AS 440 could, instead, identify ID B at item S6*l*.

Items S6*m* to S6*p* correspond, respectively, to items S3*i* to S3*l* described above with reference to FIGS. 3A and 3B.

As such, for a telephony session made by the user associated with the first telephony device 405, a telephony session establishment message is arranged to arrive at the AS 440 in the non-home IMS network 420 by use of ID 1 as a called party identifier in the telephony session establishment message. In particular, the telephony session establishment message may arrive at the AS 440 where ID 1 is an access telephony identifier associated with the AS 440. The AS 440 then identifies ID 2 and updates the telephony session establishment message so that the telephony session establishment message appears to be coming from ID 2 and passes the telephony session to the S-CSCF 435 by transmitting a telephony session establishment message comprising ID 2 as a calling party identifier to the S-CSCF 435. The S-CSCF 435 processes the telephony session establishment message in accordance with standard IMS core behaviour in which any desired originating telephony session services are provided, using the local telephony identifier, ID 2, as the source for subscriber configuration. The last AS that the S-CSCF 435 invokes, after any desired telephony session services have been provided, is a second invocation of the AS 440. The AS 440 may, however, provide any such desired telephony session services. On the second invocation, the AS 440 replaces the local telephony identifier, ID 2, with the public telephony identifier, ID A. The telephony session is passed back to the S-CSCF 435 by the AS 440 transmitting a telephony session establishment message comprising ID A as a calling party identifier to the S-CSCF 435. The S-CSCF 435 processes the telephony session establishment message in accordance with standard IMS core behaviour, by forwarding the telephony session establishment message to the second telephony device 415.

In the examples described above with reference to FIGS. 4, 5A, 5B, 6A and 6B, and in contrast to the examples described above with reference to FIGS. 1, 2, 3A and 3B, the non-home IMS network 420 has been enabled to provide terminating and/or originating call services in relation to the telephony session. Such call services may be provided in addition to any terminating and/or originating call services provided by the home IMS network 410 in relation to the telephony session.

Furthermore, in the examples described above with reference to FIGS. 4, 5A, 5B, 6A and 6B, the non-home IMS network 420 has been enabled to provide terminating and/or originating call services in relation to such telephony sessions even in scenarios in which ID 1 is associated with multiple users.

Furthermore, in the examples described above with reference to FIGS. 4, 5A, 5B, 6A and 6B, the non-home IMS network 420 has been enabled to provide terminating and/or originating call services based on ID 2. For example, the S-CSCF 435 may be configured with iFC data associated with ID 2, rather than requiring the S-CSCF 435 to be configured with iFC data associated with ID 1. This may reduce the risk of causing routing problems in relation to ID A in the telephony system 400 described above with reference to FIG. 4 compared to a case in which the S-CSCF 435 is configured with iFC data associated with ID 1 and/or may mean that the S-CSCF 435 does not need to be modified to have non-standard behaviour.

As such, methods of processing signalling relating to a telephony session in a first telephony network, namely the non-home IMS network 420, are provided. The telephony session involves a telephony device, namely the first telephony device 405 associated with a second telephony network, namely the home IMS network 410. The AS 440 receives a first telephony session establishment message (of items S5*c* for an incoming telephony session and S6*g* for an outgoing telephony session) from a first telephony network node, namely the S-CSCF 435, in the non-home IMS network 420. The first telephony session establishment message (of items S5*c* for an incoming telephony session and S6*g* for an outgoing telephony session) comprises a first telephony identifier, namely ID 1, as a called party identifier. ID 1 is associated with the non-home IMS network 420. The AS 440 identifies a second telephony identifier, namely ID 2. ID 2 is associated with the non-home IMS network 420 and is different from ID 1. The AS 440 transmits a second telephony session establishment message (of items S5*e* for an incoming telephony session and S6*i* for an outgoing telephony session) to the S-CSCF 435. The second telephony session establishment message comprises ID 2 as a telephony party identifier. For an incoming telephony session, the second telephony session establishment message comprises ID 2 as a called party identifier. For an outgoing telephony session, the second telephony session establishment message comprises ID 2 as a calling party identifier. The AS 440 receives a third telephony session establishment message (of items S5*g* for an incoming telephony session and S6*k* for an outgoing telephony session) from the S-CSCF 435. The third telephony session establishment message comprises ID 2 as a telephony party identifier. For an incoming telephony session, the third telephony session establishment message comprises ID 2 as a called party identifier. For an outgoing telephony session, the third telephony session establishment message comprises ID 2 as a calling party identifier. The AS 440 identifies a third telephony identifier, namely ID A, using ID 2. ID A is associated with the home IMS network 410. The AS 440 transmits a fourth telephony session establishment message (of items S5*i* for an incoming telephony session and S6*m* for an outgoing telephony session) to the S-CSCF 435. The fourth telephony session establishment message comprises ID A as a telephony party identifier. For an incoming telephony session, the fourth telephony session establishment message comprises ID A as a called party identifier. For an outgoing telephony session, the fourth telephony session establishment message comprises ID A as a calling party identifier.

Further, methods of processing signalling relating to a telephony session in a first telephony network, namely the non-home IMS network 420, are also provided. The telephony session involves a telephony device, namely the first telephony device 405, associated with a second telephony network, namely the home IMS network 410. The S-CSCF 435 receives a first telephony session establishment message (of items S5*b* for an incoming telephony session and S6*f* for an outgoing telephony session). The first telephony session establishment message comprises a first telephony identifier, namely ID 1 as a called party identifier. ID 1 is associated with the non-home IMS network 420. The S-CSCF 435 identifies first telephony network node, namely the AS 440, in the non-home IMS network 420 based on control logic data, namely iFC data, associated with ID 1. The AS 440 is associated with ID 1. The S-CSCF 435 transmits a second telephony session establishment message (of items S5*c* for an incoming telephony session and S6*g* for an outgoing telephony session) to the AS 440. The second telephony session establishment message comprises ID 1 as a called party identifier. The S-CSCF 435 receives a third telephony session establishment message (of items S5*e* for an incoming telephony session and S6*i* for an outgoing telephony session) from the AS 440. The third telephony session establishment message comprises a second telephony identifier, namely ID 2, as a telephony party identifier. ID 2 is associated with the non-home IMS network 420 and is different from ID 1. For an incoming telephony session, the third telephony session establishment message comprises ID 2 as a called party identifier. For an outgoing telephony session, the third telephony session establishment message comprises ID 2 as a calling party identifier. The S-CSCF 435 identifies the AS 440 based on control logic data, namely iFC data, associated with ID 2. The AS 440 is associated with ID 2. The S-CSCF 435 transmits a fourth telephony session establishment message (of items S5*g* for an incoming telephony session and S6*k* for an outgoing telephony session) to the AS 440. The fourth telephony session establishment message comprises ID 2 as a telephony party identifier. For an incoming telephony session, the fourth telephony session establishment message comprises ID 2 as a called party identifier. For an outgoing telephony session, the fourth telephony session establishment message comprises ID 2 as a calling party identifier. The S-CSCF 435 receives a fifth telephony session establishment message (of items S5*i* for an incoming telephony session and S6*m* for an outgoing telephony session) from the AS 440. The fifth telephony session establishment message comprises a third telephony identifier, namely ID A as a telephony party identifier. ID A is associated with the home IMS network 410. For an incoming telephony session, the fifth telephony session establishment message comprises ID A as a called party identifier. For an outgoing telephony session, the fifth telephony session establishment message comprises ID A as a calling party identifier. The S-CSCF 435 transmits a sixth telephony session establishment message (of items S5*k* for an incoming telephony session and S6*n* for an outgoing telephony session). The sixth telephony session establishment message comprises ID A as a telephony party identifier. For an incoming telephony session, the sixth telephony session establishment message comprises ID A as a called party identifier. For an outgoing telephony session, the sixth telephony session establishment message comprises ID A as a calling party identifier.

Various measures (for example methods, telephony network node and computer programs) to process signalling relating to a telephony session in a first telephony network are provided. The telephony session involves a telephony device associated with a second telephony network. A first telephony session establishment message is received from a first telephony network node in the first telephony network. The first telephony session establishment message comprises a first telephony identifier as a called party identifier. The first telephony identifier is associated with the first telephony network. A second telephony identifier is identified. The second telephony identifier is associated with the first telephony network and is different from the first telephony identifier. A second telephony session establishment message is transmitted to the first telephony network node. The second telephony session establishment message comprises the second telephony identifier as a telephony party identifier. A third telephony session establishment message is received from the first telephony network node. The third telephony session establishment message comprises the second telephony identifier as a telephony party identifier. A third telephony identifier is identified using the second telephony identifier. The third telephony identifier is associated with the second telephony network. A fourth telephony session establishment message is transmitted to the first telephony network node. The fourth telephony session establishment message comprises the third telephony identifier as a telephony party identifier.

As such, the first telephony network may be enabled to provide telephony session services in relation to a telephony session involving the telephony device, with limited impact on the wider telephony system and on a per-user basis. The impact on the wider telephony system is limited where the first telephony network does not advertise itself as owning the third telephony identifier. Otherwise, routing between other telephony networks may be negatively impacted. Such telephony session services may be provided even where the third telephony identifier is not owned by the first telephony network. Since the first telephony identifier is comprised in the first telephony session establishment message as a called party identifier, the first telephony session establishment message can be routed to the first telephony network reliably. If the first telephony session establishment message comprised a called party identifier that was not associated with the first telephony network, the first telephony network would typically not accept the first telephony session establishment message and would forward the first telephony session establishment message to the telephony network with which the called party identifier was associated. Further, by use of the second telephony identifier, control logic data can be stored against the user of the telephony device on the basis of the second telephony identifier. This, in turn, enables the first telephony network to provide originating and/or terminating telephony session services to the user, even where the first telephony network is not the home telephony network of the user. In addition, originating and/or terminating telephony session services may still be provided by the second telephony network unlike an over-the-top signalling model in which, although telephony session establishment messages could be routed to the first telephony network, they would, in effect, bypass the second telephony network such that the second telephony network could not provide originating and/or terminating telephony session services. This, in turn, may negatively impact user experience. Further, a user associated with the telephony device may take advantage of telephony services that are provided by the first telephony network, but are not provided by the second telephony network. As such, the second telephony network could provide the user with a basic service and the first telephony network could provide the user with additional services. In addition, the techniques described herein may be performed when the first and second telephony networks are associated with different telephony service providers where, for example, there is no business cooperation between the respective telephony service providers.

In some examples, the first telephony network comprises an IP Multimedia Subsystem (IMS) network, the first telephony network node comprises a Serving-Call Session Control Function (S-CSCF), the receiving of the first and third telephony session establishment messages comprises the first and third telephony session establishment messages being received via an IMS Service Control (ISC) interface and the transmitting of the second and fourth telephony session establishment messages comprises the second and fourth telephony session establishment messages being transmitted via the ISC interface. The techniques described herein are particularly effective when implemented in an IMS network. In addition, the techniques described herein may be performed while still providing compatibility with IMS standards. Such techniques may not require the IMS core, for example, the S-CSCF, to be modified. This may increase applicability of the techniques described herein to telephony networks where modification of the IMS core would be undesirable.

In some examples, the second telephony identifier comprises the third telephony identifier. In such examples, identifying one of the second and third telephony identifiers using the other one of the second and third telephony identifiers may be relatively efficient and may result in relatively low latency, compared to the second telephony identifier not comprising the third telephony identifier. For example, it may not be necessary to perform a lookup in a database to identify one of the second and third telephony identifiers using the other one of the second and third telephony identifiers where the second telephony identifier comprises the third telephony identifier.

In some examples, the identifying of the third telephony identifier using the second telephony identifier comprises deriving the third telephony identifier from the second telephony identifier algorithmically. In such examples, the third telephony identifier may be identified relatively efficiently and with relatively low latency by algorithmically deriving third telephony identifier from the second telephony identifier, compared, for example, to using the second telephony identifier to look up the third telephony identifier in a database.

In some examples, the first telephony identifier being associated with the first telephony network comprises the first telephony identifier having been allocated by the first telephony network. In such examples, the first telephony identifier can be owned by the first telephony network. This may provide more flexibility in terms of how the first telephony network can use the first telephony identifier than if the first telephony identifier had been allocated by another telephony network.

In some examples, the first telephony identifier is a public telephony identifier configured to be recognized in the first and second telephony networks. In such examples, the first telephony identifier can be advertised outside of the first telephony network, for example to enable telephony session establishment messages to be routed to the first telephony network.

In some examples, the second telephony identifier being associated with the first telephony network comprises the second telephony identifier having been allocated by the first telephony network. In such examples, the second telephony identifier can be owned by the first telephony network. This may provide more flexibility in terms of how the first telephony network can use the second telephony identifier than if the second telephony identifier had been allocated by another telephony network.

In some examples, the second telephony identifier is a local telephony identifier configured to be recognized in the first telephony network and configured not to be recognized in the second telephony network. In such examples, the second telephony identifier can be in a format such that the second telephony identifier can be processed within the first telephony network, but need not necessarily be in a format that could be processed or recognized in other telephony networks. This may provide additional flexibility in terms of the format of the second telephony identifier, compared to a public telephony identifier.

In some examples, the third telephony identifier being associated with the second telephony network comprises the third telephony identifier having been allocated by the second telephony network. In such examples, the third telephony identifier can be owned by the second telephony network. This may enable the second telephony network to provide telephony session services in relation to telephony sessions comprising the third telephony identifier as a telephony party identifier, while still enabling the first telephony network to provide telephony session services in relation to the same telephony sessions.

In some examples, the third telephony identifier is a public telephony identifier configured to be recognized in the first and second telephony networks. In such examples, the third telephony identifier can be advertised outside of the second telephony network, for example to enable telephony session establishment messages to be routed to the second telephony network.

In some examples, the telephony session comprises an incoming telephony session with respect to the telephony device and, for the incoming telephony session, the telephony party identifier comprised in the second, third and fourth telephony session establishment messages is a called party identifier. In such examples, the first telephony network can be enabled to provide terminating telephony session services in relation to the incoming telephony session.

In some examples, for the incoming telephony session, the first telephony identifier comprises a shared telephony identifier. In such examples, the first telephony network can be enabled to provide terminating telephony session services on a per-user basis via the use of the second telephony identifier.

In some examples, for the incoming telephony session, the identifying of the second telephony identifier comprises using the first telephony identifier to identify the second telephony identifier. In such examples, the first telephony identifier which is already available by being comprised in the first telephony session establishment message can conveniently be used to identify the second telephony identifier. This may provide relatively low-latency identification of the second telephony identifier compared to data other than the first telephony identifier being used to identify the second telephony identifier, for example where using such other data would involve a database query involving the other data.

Some examples further comprise, for an outgoing telephony session with respect to the telephony device, receiving a first outgoing telephony session establishment message from the first telephony network node. The second telephony identifier is identified. A second outgoing telephony session establishment message is transmitted to the first telephony network node. The second outgoing telephony session establishment message comprises the second telephony identifier as a calling party identifier. A third outgoing telephony session establishment message is received from the first telephony network node. The third outgoing telephony session establishment message comprises the second telephony identifier as a calling party identifier. The third telephony identifier is identified using the second telephony identifier. A fourth outgoing telephony session establishment message is transmitted to the first telephony network node. The fourth outgoing telephony session establishment message comprises the third telephony identifier as a calling party identifier. In such examples, the second telephony identifier may be used to enable both originating and terminating telephony session services to be provided in relation to telephony sessions involving the telephony device. Further, by enabling the second telephony identifier to be used in relation to both incoming and outgoing telephony session establishment messages, the number of telephony identifiers allocated by the first telephony network for providing such call services may be lower than if different telephony identifiers were allocated for originating and terminating telephony session services. In addition, the size of control logic data may be lower than if different telephony identifiers were allocated for originating and terminating telephony session services. For example, the control logic data may indicate that call barring is to be performed in relation to outgoing telephony sessions to terminating telephony devices in a predetermined geographical region and may indicate that call barring is to be performed in relation to incoming telephony sessions from originating telephony devices in the same predetermined geographical region, in both cases using the second telephony identifier.

In some examples, the telephony session comprises an outgoing telephony session with respect to the telephony device, and the telephony party identifier comprised in the second, third and fourth telephony session establishment message is a calling party identifier. In such examples, the first telephony network can be enabled to provide originating call services in relation to the outgoing telephony session.

In some examples, for the outgoing telephony session, the first telephony identifier comprises an access telephony identifier. In such examples, the first telephony network provides, via the access telephony identifier, a mechanism for telephony session establishment messages to be routed via the first telephony network, such that originating call services may be provided in relation to the outgoing telephony session.

In some examples, for the outgoing telephony session, the first telephony session establishment message comprises the third telephony identifier as a calling party identifier and the identifying of the second telephony identifier comprises using the third telephony identifier to identify the second telephony identifier. In such examples, the third telephony identifier which is already available by being comprised in the first telephony session establishment message can conveniently be used to identify the second telephony identifier. This may provide relatively low-latency identification of the second telephony identifier compared to data other than the third telephony identifier being used to identify the second telephony identifier, for example where using such other data would a database using the other data.

In some examples, at least one telephony session service is performed in relation to the telephony session in response to the receiving of the third telephony session establishment message. In such examples, the number of telephony session establishment messages may be reduced compared to at least one further telephony network node being invoked to perform the at least one telephony session service. This, in turn may result in reduced bandwidth usage in the first telephony network and/or reduced latency compared to at least one further telephony network node being invoked to perform the at least one telephony session service.

Various measures (for example methods, telephony network node and computer programs) to process signalling relating to a telephony session in a first telephony network are provided. The telephony session involves a telephony device associated with a second telephony network. A first telephony session establishment message is received. The first telephony session establishment message comprises a first telephony identifier as a called party identifier. The first telephony identifier is associated with the first telephony network. The first telephony network node identifies a first telephony network node in the first telephony network based on control logic data associated with the first telephony identifier. The first telephony network node is associated with the first telephony identifier. A second telephony session establishment message is transmitted to the first telephony network node. The second telephony session establishment message comprises the first telephony identifier as a called party identifier. A third telephony session establishment message is received from the first telephony network node. The third telephony session establishment message comprises a second telephony identifier as a telephony party identifier. The second telephony identifier is associated with the first telephony network and is different from the first telephony identifier. The first telephony network node is identified based on control logic data associated with the second telephony identifier. The first telephony network node is associated with the second telephony identifier. A fourth telephony session establishment message is transmitted to the first telephony network node. The fourth telephony session establishment message comprises the second telephony identifier as a called party identifier. A fifth telephony session establishment message is received from the first telephony network node. The fifth telephony session establishment message comprises a third telephony identifier as a telephony party identifier. The third telephony identifier is associated with the second telephony network. A sixth telephony session establishment message is transmitted. The sixth telephony session establishment message comprises the third telephony identifier as a telephony party identifier.

The above embodiments are to be understood as illustrative examples of the invention. Further embodiments of the invention are envisaged.

Examples are described above which relate to processing signalling relating to a telephony session between multiple telephony devices. Other examples are envisaged which relate, more generally, to processing telecommunications data relating to telecommunication between multiple telephony devices. Such examples could be used, for example, in relation to the Short Message Service (SMS) and/or Multimedia Messaging Service (MMS) forms of telecommunication in which a telephony session is not established between multiple telephony devices.

Examples are described above in which the non-home IMS network 430 transmits a telephony session establishment message comprising ID A as a telephony party identifier. In other examples, such a message does not comprise ID A as a telephony party identifier. Instead of the calling party identifier in such an outgoing telephony session establishment message being ID A, the calling party identifier could be withheld or a telephony identifier other than ID A could be used as the calling party identifier. An example of another such telephony identifier is the shared telephony identifier described above. Instead of the called party identifier in such an incoming telephony session establishment message being ID A, a telephony identifier other than ID A could be used as the called party identifier. An example of another such telephony identifier is another telephony identifier with which the user of the first telephony device 405 is associated. The user of the first telephony device 405 may, for example, have indicated that incoming calls to the user should be temporarily diverted to the other telephony identifier.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing signalling relating to a telephony session in a first service provider network associated with a first service provider, the telephony session involving a telephony device associated with a second service provider network, the second service provider network being associated with a second, different service provider, the method comprising:
   receiving a first telephony session establishment message from a first network node in the first service provider network, the first telephony session establishment message comprising a first telephony identifier as a called party identifier, the first telephony identifier being associated with the first service provider network;
   identifying a second telephony identifier, the second telephony identifier being associated with the first service provider network and being different from the first telephony identifier, wherein the second telephony identifier is a local telephony identifier configured to be recognised in the first service provider network and configured not to be recognised in the second service provider network;
   transmitting a second telephony session establishment message to the first network node, the second telephony session establishment message comprising the second telephony identifier as a telephony party identifier, whereby to enable call services to be provided in the first service provider network on the basis of the second telephony identifier;
   receiving a third telephony session establishment message from the first network node, the third telephony session establishment message comprising the second telephony identifier as a telephony party identifier;
   identifying a third telephony identifier using the second telephony identifier, the third telephony identifier being associated with the second service provider network; and
   transmitting a fourth telephony session establishment message to the first network node, the fourth telephony session establishment message comprising the third telephony identifier as a telephony party identifier.

2. The method of claim 1, wherein the first service provider network comprises an IP Multimedia Subsystem (IMS) network, wherein the first network node comprises a Serving-Call Session Control Function (S-CSCF), wherein the receiving of the first and third telephony session establishment messages comprises the first and third telephony session establishment messages being received via an IMS Service Control (ISC) interface, and wherein the transmitting of the second and fourth telephony session establishment messages comprises the second and fourth telephony session establishment messages being transmitted via the ISC interface.

3. The method of claim 1, wherein the second telephony identifier comprises the third telephony identifier.

4. The method of claim 1, wherein the identifying of the third telephony identifier using the second telephony identifier comprises deriving the third telephony identifier from the second telephony identifier algorithmically.

5. The method of claim 1, wherein the first telephony identifier being associated with the first service provider network comprises the first telephony identifier having been allocated by the first service provider network.

6. The method of claim 1, wherein the first telephony identifier is a public telephony identifier configured to be recognised in the first and second service provider networks.

7. The method of claim 1, wherein the second telephony identifier being associated with the first service provider network comprises the second telephony identifier having been allocated by the first service provider network.

8. The method of claim 1, wherein the third telephony identifier being associated with the second service provider network comprises the third telephony identifier having been allocated by the second service provider network.

9. The method of claim 1, wherein the third telephony identifier is a public telephony identifier configured to be recognised in the first and second service provider networks.

10. The method of claim 1, wherein the telephony session comprises an incoming telephony session with respect to the telephony device, and wherein, for the incoming telephony session, the telephony party identifier comprised in the second, third and fourth telephony session establishment messages is a called party identifier.

11. The method of claim 10, wherein, for the incoming telephony session, the first telephony identifier comprises a shared telephony identifier.

12. The method of claim 10, wherein, for the incoming telephony session, the identifying of the second telephony identifier comprises using the first telephony identifier to identify the second telephony identifier.

13. The method of claim 10, the method further comprising, for an outgoing telephony session with respect to the telephony device:
   receiving a first outgoing telephony session establishment message from the first service provider network node;
   identifying the second telephony identifier;
   transmitting a second outgoing telephony session establishment message to the first network node, the second outgoing telephony session establishment message comprising the second telephony identifier as a calling party identifier;
   receiving a third outgoing telephony session establishment message from the first network node, the third outgoing telephony session establishment message comprising the second telephony identifier as a calling party identifier;
   identifying the third telephony identifier using the second telephony identifier; and
   transmitting a fourth outgoing telephony session establishment message to the first network node, the fourth outgoing telephony session establishment message comprising the third telephony identifier as a calling party identifier.

14. The method of claim 1, wherein the telephony session comprises an outgoing telephony session with respect to the telephony device, and wherein the telephony party identifier comprised in the second, third and fourth telephony session establishment message is a calling party identifier.

15. The method of claim 14, wherein, for the outgoing telephony session, the first telephony identifier comprises an access telephony identifier.

16. The method of claim 14, wherein, for the outgoing telephony session, the first telephony session establishment message comprises the third telephony identifier as a calling party identifier and the identifying of the second telephony identifier comprises using the third telephony identifier to identify the second telephony identifier.

17. The method of claim 1, comprising performing at least one telephony session service in relation to the telephony session in response to the receiving of the third telephony session establishment message.

18. A method of processing signalling relating to a telephony session in a first service provider network associate with a first service provider, the telephony session involving a telephony device associated with a second service provider network, the second service provider network being associated with a second different service provider, the method comprising:
   receiving a first telephony session establishment message, the first telephony session establishment message comprising a first telephony identifier as a called party identifier, the first telephony identifier being associated with the first service provider network;
   identifying a first network node in the first service provider network based on control logic data associated with the first telephony identifier, the first network node being associated with the first telephony identifier;
   transmitting a second telephony session establishment message to the first network node, the second telephony session establishment message comprising the first telephony identifier as a called party identifier, wherein the second telephony identifier is a local telephony identifier configured to be recognised in the first service provider network and configured not to be recognised in the second service provider network;
   receiving a third telephony session establishment message from the first network node, the third telephony session establishment message comprising a second telephony identifier as a telephony party identifier, the second telephony identifier being associated with the first service provider network and being different from the first telephony identifier, whereby to enable call services to be provided in the first service provider network on the basis of the second telephony identifier;
   identifying the first network node based on control logic data associated with the second telephony identifier, the first network node being associated with the second telephony identifier;
   transmitting a fourth telephony session establishment message to the first network node, the fourth telephony session establishment message comprising the second telephony identifier as a telephony party identifier;
   receiving a fifth telephony session establishment message from the first network node, the fifth telephony session establishment message comprising a third telephony identifier as a telephony party identifier, the third telephony identifier being associated with the second service provider network and having been identified using the second telephony identifier; and
   transmitting a sixth telephony session establishment message, the sixth telephony session establishment message comprising the third telephony identifier as a telephony party identifier.

19. A network node configured to perform a method of processing signalling relating to a telephony session in a first service provider network associated with a first service provider, the telephony session involving a telephony device associated with a second service provider network, the second service provider network being associated with a second, different service provider, the method comprising:
   receiving a first telephony session establishment message from a first network node in the first service provider network, the first telephony session establishment message comprising a first telephony identifier as a called party identifier, the first telephony identifier being associated with the first service provider network;
   identifying a second telephony identifier, the second telephony identifier being associated with the first service provider network and being different from the first telephony identifier, wherein the second telephony identifier is a local telephony identifier configured to be recognised in the first service provider network and configured not to be recognised in the second service provider network;
   transmitting a second telephony session establishment message to the first network node, the second telephony session establishment message comprising the second telephony identifier as a telephony party identifier, whereby to enable call services to be provided in the first service provider network on the basis of the second telephony identifier;
   receiving a third telephony session establishment message from the first network node, the third telephony session establishment message comprising the second telephony identifier as a telephony party identifier;
   identifying a third telephony identifier using the second telephony identifier, the third telephony identifier being associated with the second service provider network; and
   transmitting a fourth telephony session establishment message to the first network node, the fourth telephony session establishment message comprising the third telephony identifier as a telephony party identifier.

20. A network node configured to perform a method of processing signalling relating to a telephony session in a first service provider network associated with a first service provider, the telephony session involving a telephony device associated with a second service provider network, the second service provider network being associated with a second, different service provider, the method comprising:
   receiving a first telephony session establishment message, the first telephony session establishment message comprising a first telephony identifier as a called party identifier, the first telephony identifier being associated with the first service provider network;
   identifying a first network node in the first service provider network based on control logic data associated with the first telephony identifier, the first network node being associated with the first telephony identifier;
   transmitting a second telephony session establishment message to the first network node, the second telephony session establishment message comprising the first telephony identifier as a called party identifier, wherein the second telephony identifier is a local telephony identifier configured to be recognised in the first service provider network and configured not to be recognised in the second service provider network;
   receiving a third telephony session establishment message from the first network node, the third telephony session establishment message comprising a second telephony identifier as a telephony party identifier, the second telephony identifier being associated with the first service provider network and being different from the first telephony identifier, whereby to enable call services to be provided in the first service provider network on the basis of the second telephony identifier;
   identifying the first network node based on control logic data associated with the second telephony identifier, the first network node being associated with the second telephony identifier;
   transmitting a fourth telephony session establishment message to the first network node, the fourth telephony session establishment message comprising the second telephony identifier as a telephony party identifier;

receiving a fifth telephony session establishment message from the first network node, the fifth telephony session establishment message comprising a third telephony identifier as a telephony party identifier, the third telephony identifier being associated with the second service provider network and having been identified using the second telephony identifier; and transmitting a sixth telephony session establishment message, the sixth telephony session establishment message comprising the third telephony identifier as a telephony party identifier.

\* \* \* \* \*